US012802331B2

(12) United States Patent
Park et al.

(10) Patent No.: US 12,802,331 B2
(45) Date of Patent: Nov. 17, 2026

(54) PRECISION MODULATED SHADING

(71) Applicant: SAMSUNG ELECTRONICS CO., LTD., Suwon-si (KR)

(72) Inventors: Junmo Park, Suwon-si (KR); Arun Radhakrishnan, Austin, TX (US); Seyeong Byeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 35 days.

(21) Appl. No.: 18/620,374

(22) Filed: Mar. 28, 2024

(65) Prior Publication Data

US 2025/0022205 A1 Jan. 16, 2025

Related U.S. Application Data

(60) Provisional application No. 63/526,067, filed on Jul. 11, 2023.

(51) Int. Cl.
*G06T 15/00* (2011.01)
*G06F 9/30* (2018.01)

(52) U.S. Cl.
CPC ........ *G06T 15/005* (2013.01); *G06F 9/30014* (2013.01)

(58) Field of Classification Search
CPC ......... G06T 15/005; G06T 15/80; G06T 1/20; G06T 2200/28; G06F 9/30014
See application file for complete search history.

(56) References Cited

U.S. PATENT DOCUMENTS

| | | | |
|---|---|---|---|
| 9,916,682 B2 | 3/2018 | Sathe et al. | |
| 10,332,308 B2 | 6/2019 | Chen et al. | |
| 11,120,602 B2 | 9/2021 | Nevraev et al. | |
| 11,455,766 B2 | 9/2022 | Argade et al. | |
| 2015/0039661 A1* | 2/2015 | Blomgren | H03M 7/24 708/204 |
| 2018/0321938 A1* | 11/2018 | Boswell | G06F 9/3001 |
| 2020/0293286 A1 | 9/2020 | He et al. | |
| 2020/0319851 A1* | 10/2020 | Rhisheekesan | G06F 7/4988 |
| 2021/0287423 A1 | 9/2021 | Guenther et al. | |
| 2021/0358191 A1* | 11/2021 | Frascati | G06T 15/005 |
| 2022/0067496 A1 | 3/2022 | Sarel et al. | |
| 2022/0318013 A1* | 10/2022 | Mellempudi | G06F 9/30014 |

FOREIGN PATENT DOCUMENTS

| | | |
|---|---|---|
| KR | 10-2021-0128387 A | 10/2021 |
| KR | 10-2021-0141307 A | 11/2021 |

OTHER PUBLICATIONS

Kalamkar et al., "A Study of BFLOAT16 for Deep Learning Training", arXiv, Jun. 13, 2019, 10 total pages, arXiv:1905.12322v3 [cs.LG].

Website, "bfloat16 floating-point format", Wikipedia, Aug. 18, 2023, 5 total pages, https://en.wikipedia.org/w/index.php?title=Bfloat16_floating-point_format&oldid=1168915275.

* cited by examiner

*Primary Examiner* — Michelle Chin
(74) *Attorney, Agent, or Firm* — Sughrue Mion, PLLC

(57) ABSTRACT

Methods and apparatuses for performing precision-modulated shading (PMS) using a graphics processing unit (GPU), including: obtaining a shading instruction corresponding to a floating-point operand; determining a precision mode which applies to the shading instruction from among a plurality of precision modes for processing shading instructions; and based on the determined precision mode, truncating the floating-point operand, and executing the shading instruction using the truncated floating-point operand.

31 Claims, 11 Drawing Sheets

PRECISION MODULATED SHADING

CROSS-REFERENCE TO RELATED APPLICATIONS

This application is based on and claims priority under 35 U.S.C. § 119 to U.S. Provisional Patent Application No. 63/526,067, filed on Jul. 11, 2023, in the United States Patent and Trademark Office, the disclosure of which is incorporated by reference herein in its entirety.

BACKGROUND

1. Field

The present disclosure relates to performing graphics processing, and more particularly to precision-modulating shading (PMS) in a graphics processing pipeline.

2. Description of Related Art

Floating-point number formats are computer number formats which may be useful in computer processing tasks such as graphics processing and artificial intelligence (AI). The single-precision floating-point format, also referred to as an FP32 format or a float32 format, is a 32-bit floating-point number format which is defined in the Institute of Electrical and Electronics Engineers (IEEE) 754 standard. The FP32 format may be useful because it may allow a relatively large dynamic range to be represented with relatively high precision, but FP32 operations may require a large amount of processing and memory capacity because 32 bits are used to represent each floating-point number.

Recently, other floating-point number formats, for example a 16-bit brain floating-point format referred to as BF16 format or a bfloat16 format, have been used to reduce processor and memory requirements in graphics processing and AI operations. However, the precision which floating-point number formats such as the BF16 format are capable of representing may be significantly lower than the precision of the FP32 format. This reduced precision may be suitable for some operations, but may cause significant processing errors when used for other operations. Therefore, when less-precise floating-point number formats such as the BF16 format are applied to all instructions in a processing pipeline, the results provided by the processing pipeline, for example graphics rendering results, may be significantly corrupted in comparison with results provided by more precise number formats such as the FP32 format.

Therefore, there is a need for methods and apparatuses which may selectively apply different floating-point number formats to instructions in a processing pipeline in order to reduce processing and memory requirements while reducing errors and corruptions in processing results.

SUMMARY

Provided are apparatuses and methods for performing precision modulated shading (PMS).

Also provided are apparatuses and methods for inserting brain floating-point operations having different precisions in appropriate locations in a processing pipeline by identifying code sections, or for example instructions, which are sensitive to a precision that will affect processing results such as rendering quality.

Additional aspects will be set forth in part in the description which follows and, in part, will be apparent from the description, or may be learned by practice of the presented embodiments.

In accordance with an aspect of the disclosure, a method of performing precision-modulated shading (PMS) using a graphics processing unit (GPU) includes: obtaining a shading instruction corresponding to a floating-point operand; determining a precision mode which applies to the shading instruction from among a plurality of precision modes for processing shading instructions; and based on the determined precision mode, truncating the floating-point operand, and executing the shading instruction using the truncated floating-point operand.

In accordance with an aspect of the disclosure, a method of performing precision-modulated shading (PMS) using a graphics processing unit (GPU) includes: obtaining a control flow graph including a plurality of shading instructions; setting a precision mode for the plurality of shading instructions to be a default precision mode, wherein the default precision mode corresponds to a first precision level; evaluating each instruction in the plurality of shading instructions to determine whether to apply a modified precision mode, wherein the modified precision mode corresponds to a second precision level that is different from the first precision level; and based on the default precision mode being applied to a first shading instruction from among the plurality of shading instructions, controlling at least one shader processor to: set a mode register included in the at least one shader processor to a first value corresponding to the default precision mode, truncate a first floating-point operand corresponding to the first shading instruction, and execute the first shading instruction using a computation module included in the at least one shader processor based on the truncated first floating-point operand.

In accordance with an aspect of the disclosure, a graphics processing unit (GPU) for performing precision-modulated shading (PMS), includes at least one shader processor configured to: obtain a shading instruction corresponding to a floating-point operand; determine a precision mode which applies to the shading instruction from among a plurality of precision modes for processing shading instructions; and based on the determined precision mode, truncate the floating-point operand, and execute the shading instruction using the truncated floating-point operand.

In accordance with an aspect of the disclosure, a device for performing precision-modulated shading (PMS) includes a graphics processing unit (GPU) including at least one shader processor, wherein the at least one shader processor includes a mode register and a computation module; and at least one controller configured to: obtain a control flow graph including a plurality of shading instructions; set a precision mode for the plurality of shading instructions to be a default precision mode, wherein the default precision mode corresponds to a first precision level; and evaluate each instruction in the plurality of shading instructions to determine whether to apply a modified precision mode, wherein the modified precision mode corresponds to a second precision level that is different from the first precision level, wherein based on the default precision mode being applied to a first shading instruction from among the plurality of shading instructions, the at least one controller is further configured to control the at least one shader processor to set the mode register to a first value corresponding to the default precision mode, truncate a first floating-point operand corresponding to the first shading instruction, and execute the first shading instruction using the computation module based on the truncated first floating-point operand.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
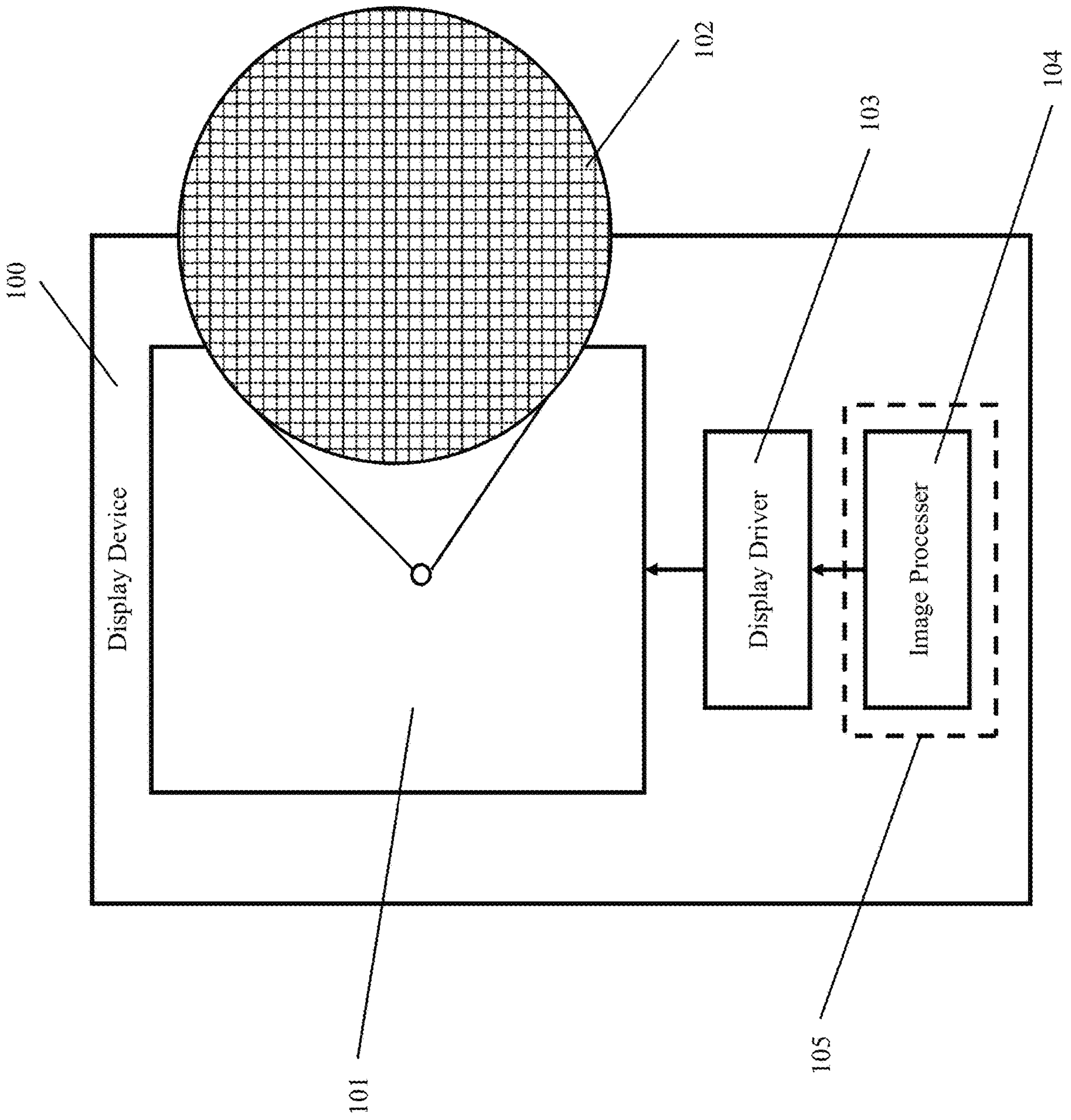
FIG. 1 is a block diagram illustrating a display device according to embodiments.

Advantages and features of embodiments of the disclosure, and methods of achieving them, will be more apparent with reference to the description below in conjunction with the accompanying drawings. However, embodiments are not limited thereto. In addition, specific configurations described only in a particular embodiment may be used in other embodiments. Throughout the description below, the same reference numerals may generally refer to the same elements.

The terminology used herein is for the purpose of describing example embodiments and is not intended to limit the scope of the disclosure. In this specification, the singular also includes the plural, unless specifically stated otherwise in the phrase. As used herein, "comprises" and/or "comprising" may mean that a recited element, step, operation, and/or apparatus does not exclude the presence or addition of one or more other elements, steps, operations, and/or apparatuses.

Unless otherwise defined, all terms (including technical and scientific terms) used herein may be used with the meaning commonly understood by those of ordinary skill in the art to which this disclosure belongs. In addition, terms defined in a commonly used dictionary are not to be interpreted ideally or excessively unless clearly defined in particular.

In addition, before proceeding with the detailed description that follows, definitions of certain words and phrases used herein are set forth. The terms "comprise" and "include" and derivatives of the terms "comprise" and "include" denote inclusive without limitation. The word "connects" and derivatives of the word "connect" refer to any direct or indirect communication between two or more components, whether or not the two or more components are in physical contact with each other. The terms "transmit", "receive", and "communicate", and derivatives of the terms "transmit", "receive", and "communicate" include both direct and indirect communication. The word "or" is an inclusive word meaning 'and/or'. The word "related to" and derivatives of "related to" denote to include, to be included in, to interconnect with, to imply, to be implied in, to connect with, to combine with, to communicate with, to cooperate with, to intervene, to place alongside, to approximate, to be bound by, to have, to have the characteristics of, to relate to, and the like. The term "controller" denotes any apparatus, system, or part thereof that controls at least one operation. Such a controller may be implemented in hardware or a combination of hardware and software and/or firmware. Functions associated with any particular controller may be centralized or distributed, either locally or remotely. The phrase "at least one", when used with a list of items, denotes that different combinations of one or more of the listed items may be used, and that only one item in the list may be required. For example, "at least one of A, B, and C" includes any one of combinations of A, B, C, A and B, A and C, B and C, and A, B and C.

In addition, various functions described below may be implemented or supported by artificial intelligence technology or one or more computer programs, and each of the programs may include computer-readable program code and may be embodied in a computer-readable medium. The terms "application" and "program" refer to one or more computer programs, software components, sets of instructions, procedures, functions, objects, classes, instances, related data, or portions thereof suitable for implementation of suitable computer-readable program code. The term "computer-readable program code" includes computer code of any type, including source code, object code, and executable code. The term "computer-readable medium" includes any type of medium that may be accessed by a computer, such as read only memory (ROM), random access memory (RAM), a hard disk drive, a compact disk (CD), a digital video disk (DVD), or any other type of memory. A "non-transitory" computer-readable medium excludes wired, wireless, optical, or other communication links that transmit transitory electrical or other signals. Non-transitory computer-readable media includes media in which data may be permanently stored, and media in which data is stored and may be overwritten later, such as a rewritable optical disc or a removable memory apparatus.

In various example embodiments described below, a hardware approach is described as an example. However, because various example embodiments include technology using both hardware and software, the various example embodiments do not exclude a software-based approach.

In addition, terms used in the description below, are examples for convenience of description. Accordingly, the example embodiments are not limited to the terms described below, and other terms having equivalent technical meanings may be used.

FIG. 1 is a block diagram illustrating a display device according to embodiments. In particular, FIG. 1 illustrates an embodiment of a display device 100 into which any of the methods or apparatus described in this disclosure may be integrated. The display device 100 may have any form factor such as a panel display for a personal computer (PC), a laptop computer, a mobile device, a projector, VR goggles, etc., and may be based on any imaging technology such as cathode ray tube (CRT), digital light projector (DLP), light emitting diode (LED), liquid crystal display (LCD), organic LED (OLED), quantum dot, etc., for displaying a rasterized image 101 using pixels 102. An image processor 104 such as graphics processing unit (GPU) and/or display driver circuit 103 may process and/or convert the image to a form that may be displayed on or through the imaging device 100. A portion of the image 101 is shown enlarged so pixels 102 are visible. Any of the methods or apparatus described herein may be integrated into the imaging device 100, processor 104, and/or display driver circuit 103 to generate pixels 102 shown in FIG. 1, and/or groups thereof. In some embodiments, the image processor 104 may include a pipeline that may perform processing operations which may implement one or more precision modulated shading (PMS) operations and any other embodiments described herein, implemented, for example, on an integrated circuit 105. In some embodiments, the integrated circuit 105 may also include the driver circuit 103 and/or any other components that may implement any other functionality of the display device 100.

Figure 2:
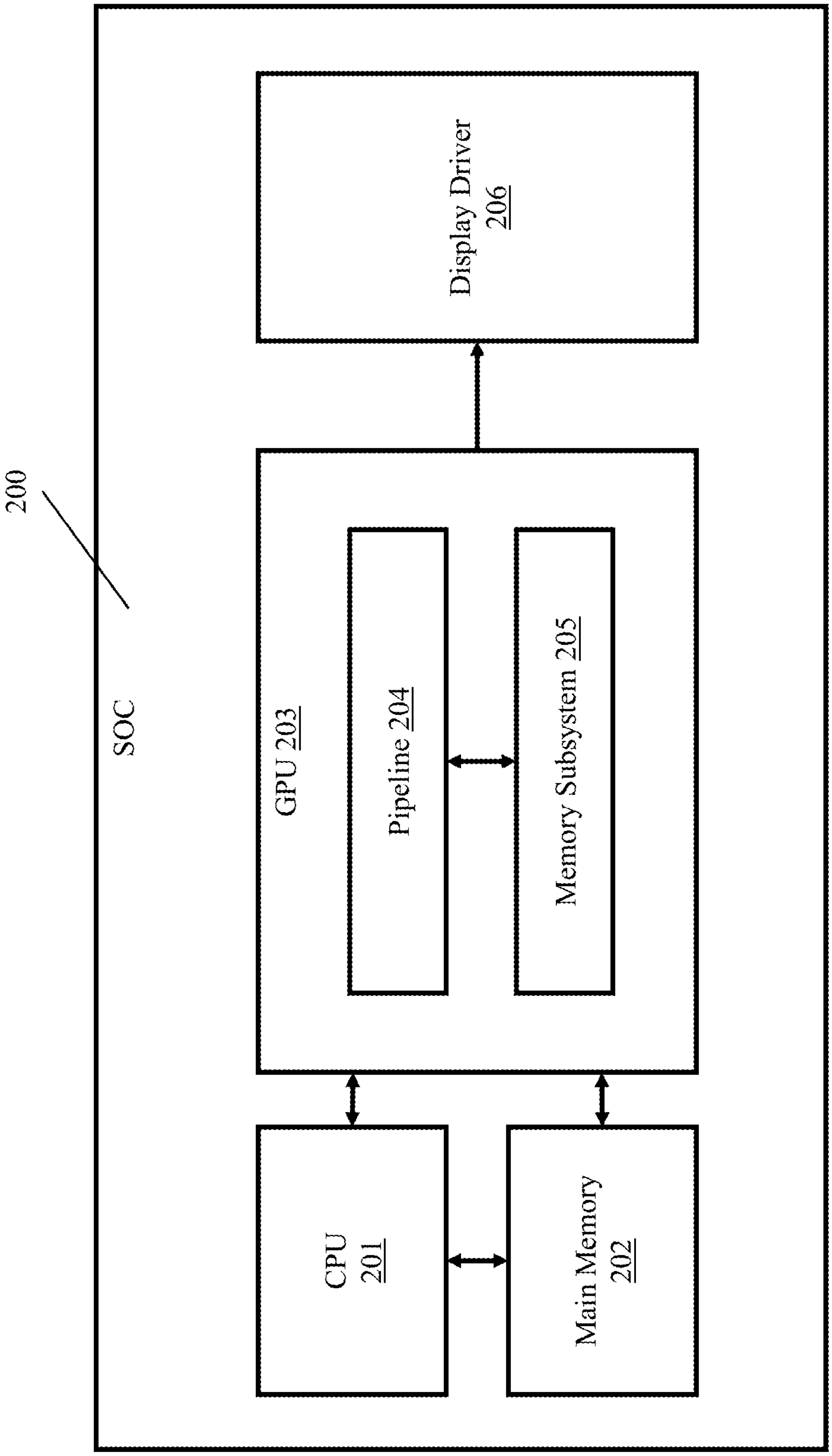
FIG. 2 is a block diagram illustrating a system-on-chip (SOC) according to embodiments.

FIG. 2 is a block diagram illustrating a system-on-chip (SOC) device according to embodiments. In particular, FIG. 2 illustrates an embodiment of an SOC 200 including a graphics processing unit (GPU) 203 that may implement PMS operations according to this disclosure. The SOC 200 may include a central processing unit (CPU) 201, a main memory 202, a GPU 203, and a display driver 206. The GPU 203 may include a pipeline 204 and a memory subsystem 205 which may be implemented, for example, in a manner similar to those described above and below with respect to FIGS. 1 and 3, and which may implement any of the PMS operations described herein, including, for example, those described below with respect to FIGS. 4-8. The SOC 200 illustrated in FIG. 2 may be integrated, for example, into an image display device such as the display device 100 illustrated in FIG. 1.

Figure 3A:
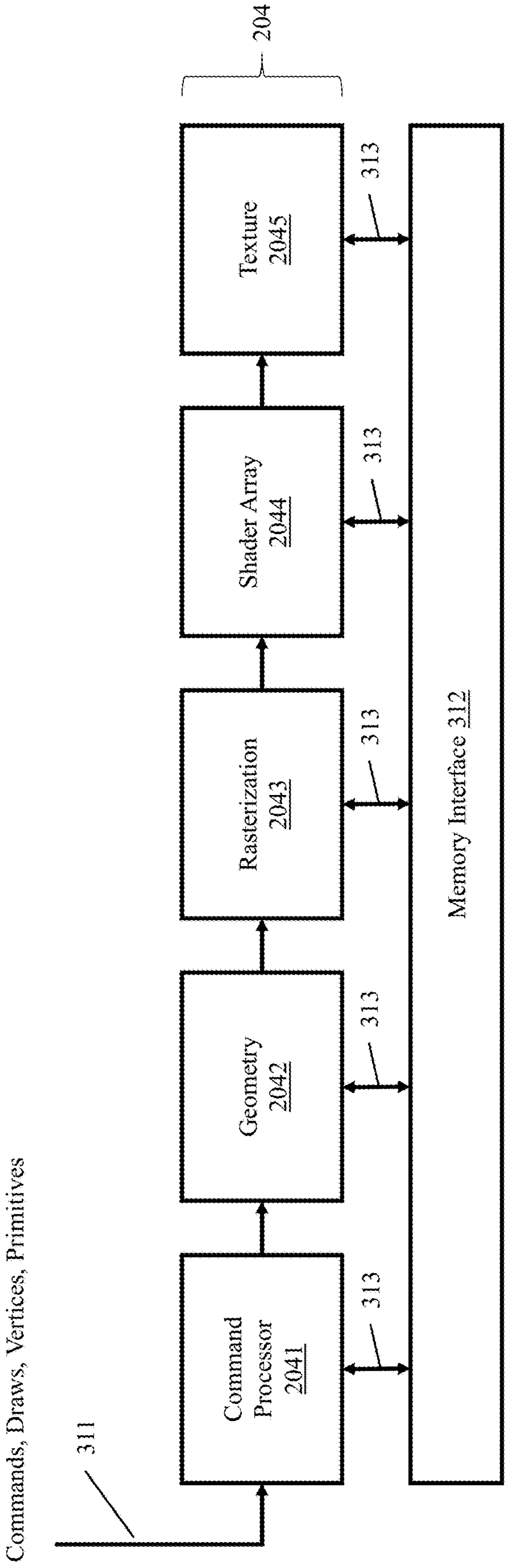
FIG. 3A is a block diagram illustrating a graphics processing unit (GPU) pipeline, according to embodiments.

FIG. 3A is a block diagram illustrating a GPU pipeline, according to embodiments. In particular, FIG. 3A illustrates a pipeline 204 which may be included in a GPU 203, and which may include components or stages. The pipeline 204 may perform processing operations such as image processing or graphics processing operations. The pipeline 204 may include one or more clients such as a command processor 2041, a geometry module 2042, a rasterizing module 2043, one or more shader arrays 2044, which may include one or more shader modules 321, and a texture module 2045 which may access a memory interface 312 through memory requests 313, however, embodiments are not limited thereto, and other embodiments may have any other number and/or types of clients. In some embodiments, the memory interface may include one or more buses, arbiters, and/or the like. A software driver, which may be included in or executed by one or more of the GPU 203 and the CPU 201, may provide input 311 such as commands, draws, vertices, primitives, and/or the like to the pipeline 204.

Figure 3B:
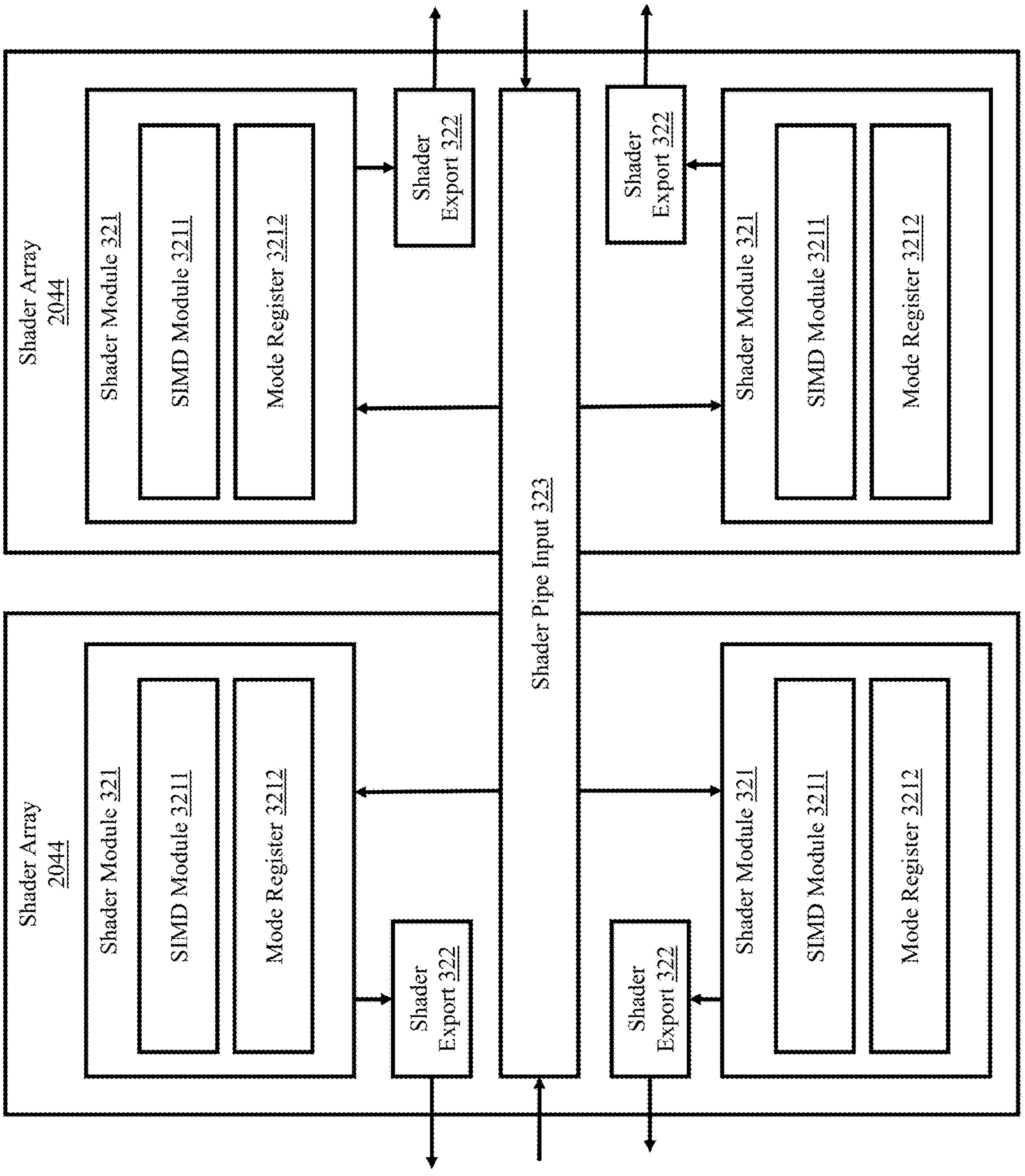
FIG. 3B is a block diagram illustrating a shader array pipeline, according to embodiments.

FIG. 3B is a block diagram illustrating a shader array pipeline, according to embodiments. As shown in FIG. 3B, the shader array 2044 may include a shader piper input module 323, one or more shader modules 321, and one or more shader export modules 322. In embodiments, the GPU 203 may include a plurality of shader arrays 2044, which may each be connected to the shader pipe input module 323. Each of the one or more shader modules 321 may include a single instruction multiple data (SIMD) module 3211 and a mode register 3212.

In embodiments, a thread may refer to a smallest sequence of instructions which can be managed independently, and a thread block may refer to a group of threads which may be executed serially or in parallel. A wave or warp may refer to a group of thread blocks which run concurrently. In embodiments, the shader pipe input module 323 may allocate resources and assign waves to an available wave slots in the one or more shader modules 321 for execution. The shader module 321 may schedule waves to interleave execution of their instructions and controls how instructions are executed. In embodiments, the SIMD module 3211 may process single instruction on multiple pieces of data, for example data corresponding to multiple threads. In embodiments, the SIMD module 3211 may be a SIMD32 module capable of processing data corresponding to thirty-two threads, but embodiments are not limited thereto. The SIMD module 3211 may execute the instructions according to a precision level corresponding to a precision mode, which may be indicated by a value stored in the mode register 3212. In embodiments, the SIMD module 3211 may be referred to as a computation module. In embodiments, a wave may correspond to at least one of a vertex, a pixel, a primitive, or any other element processed by the GPU 203. When the wave is finished processing, a result of the processing may be exported to the shader export module 322.

As discussed above, a floating-point number format such as the FP32 format may allow a relatively large dynamic range to be represented with relatively high precision, but may also impose a relatively large processing and memory cost. In order to reduce this processing and memory cost, other floating-point number formats such as the BF16 format may be used. However, these floating-point number formats may result in reduced precision in comparison with the FP32 format, which may cause processing errors and corruption when used with some operations or instructions executed by a processing pipeline.

Therefore, embodiments are directed to a process for performing precision modulated shading (PMS), which may enable a plurality of floating-point number formats to be used by a processing pipeline, for example the pipeline 204 including the shader module 321 discussed above.

Figure 4:
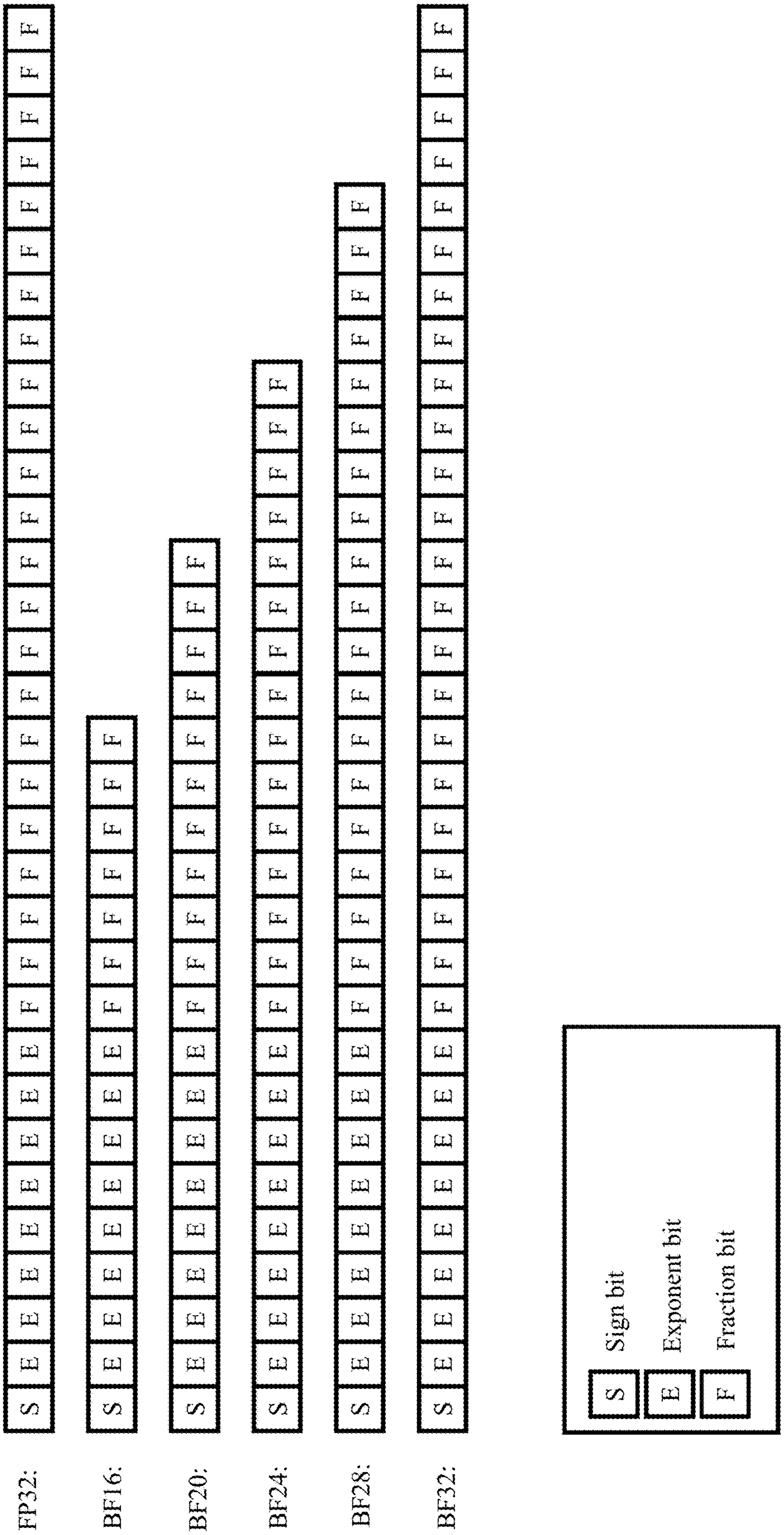
FIG. 4 is a block diagram illustrating an image processing pipeline, according to embodiments.

FIG. 4 is a diagram illustrating examples of floating-point number formats, according to embodiments. A floating-point number may be represented using a sign bit S, one or more exponent bits E, and one or more fraction bits F. In embodiments, the number represented by the fraction bits F may be referred to as a mantissa.

For example, a binary number "101011.101" may be represented using scientific notation as "1.01011101*2^5". To represent this example binary number using a floating-point number format, a sign bit S may be used to indicate that the number is positive, exponent bits E may be used to indicate the bits "101" to represent the exponent of "5", and fraction bits F may be used to indicate the bits "01011101" to the right of the binary point (with an implicit bit of "1" to the left of the binary point) to represent the mantissa.

As shown in FIG. 4, the FP32 format may include one sign bit S, eight exponent bits E, and 23 fraction bits F. The BF16 format may be understood as the FP32 format with the lower sixteen least significant bits (LSBs) of the mantissa truncated. Accordingly, the BF16 format may include one sign bit S and eight exponent bits E, but may include only seven fraction bits F. Because the FP32 format and the BF16 format may express floating-point numbers using the same amount of exponent bits E, the dynamic ranges of these two floating-point number formats may be the same or similar. However, because the BF16 format uses fewer fraction bits F than the FP32 format, a precision level of floating-point numbers which may be represented by the BF16 format may be significantly lower than a precision level of floating-point numbers which may be represented by the FP32 format.

As discussed above, embodiments may relate to a process for performing PMS, which may enable a pipeline, for example the pipeline 204, to perform operations using different floating-point number formats based on a precision level required for those operations. In embodiments, these other floating-point formats may have the same number of sign bits S and exponent bits E as the FP32 format, but may vary the number of fraction bits F used to represent the mantissa. For example, as shown in FIG. 4, each of a BF20 format, a BF24 format, and a BF28 format may include one sign bit S and eight exponent bits E. Therefore, all of these floating-point number formats may have dynamic ranges which are the same as, or similar to, the FP32 format. However, the BF20 format may include eleven fraction bits F, the BF24 format may include fifteen fraction bits F, and the BF28 format may include nineteen fraction bits F. Accordingly, the BF20 format, the BF24 format, and the BF28 may provide a range of precision levels which are higher than the precision level provided by the BF16 format, while still providing reductions in processing and memory requirements with respect to the FP32 format. According to embodiments, PMS may enable the GPU 203 to apply different precision modes corresponding to the different precision levels to various instructions. When an instruction corresponding to a particular precision mode is executed, the GPU 203 may truncate the mantissas of operands corresponding to the instruction, so that the operands have a floating-point number format corresponding to the precision mode.

Although embodiments are described herein as using floating-point number formats such as the BF16 format, the BF20 format, the BF24 format, the BF28 format, and the FP32 format, embodiments are not limited thereto, and embodiments may be applied to any other floating point format.

Figure 5:
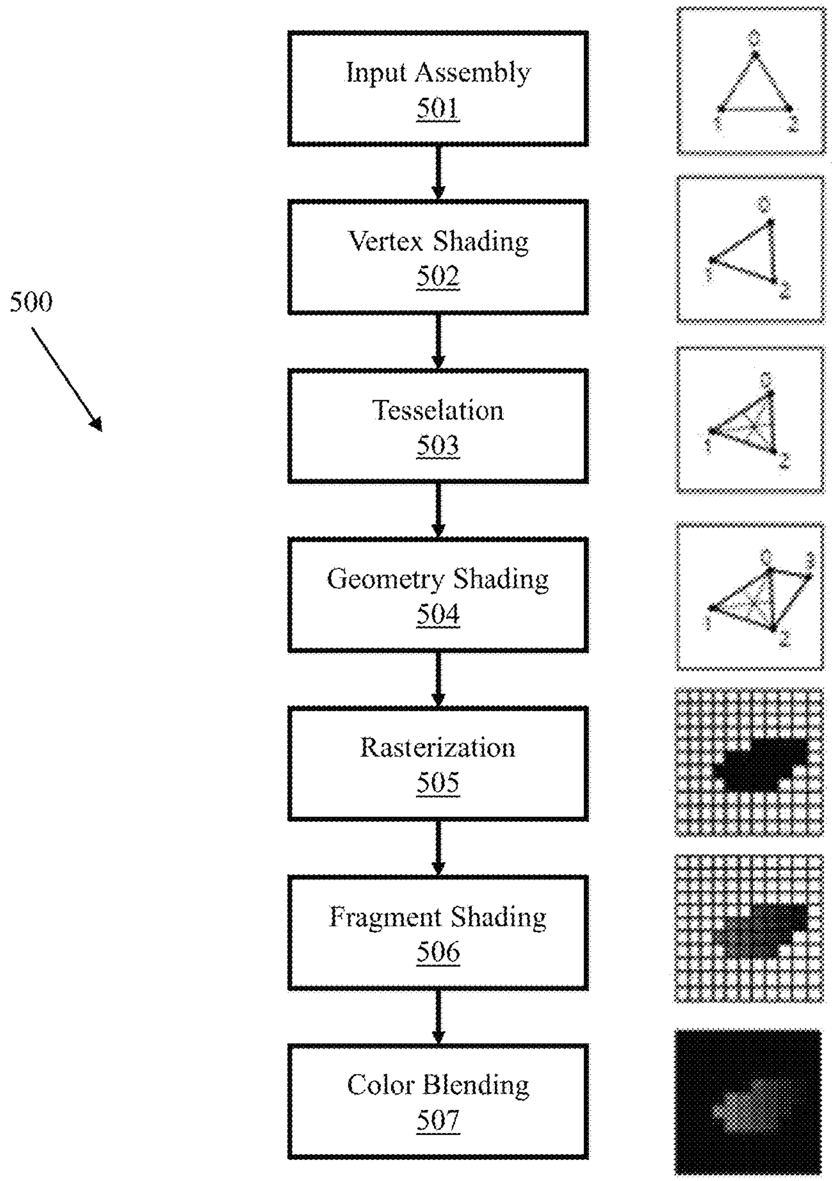
FIG. 5 is a diagram illustrating examples of floating-point number formats, according to embodiments.

FIG. 5 is a block diagram illustrating an image processing pipeline, according to embodiments. In particular, FIG. 5 illustrates a pipeline 500 which may represent a logical processing flow for performing a processing task such as image or graphics processing. As shown in FIG. 5, the pipeline 500 may include input assembly 501, vertex shading 502, tessellation 503, geometry shading 504, rasterization 505, fragment shading 506, and color blending 507.

In embodiments, the pipeline 500 may correspond to operations performed by elements of the GPU 203, for example the pipeline 204 and the elements included therein. For example, the input assembly 501 and the tessellation 503 may be performed by the geometry module 2042, the rasterization may be performed by the rasterizing module 2043, the color blending may be performed by the texture module 2045, and the vertex shading 502, the geometry shading 504, and the fragment shading 506 may be performed by one or more shader modules 321.

According to embodiments, PMS may allow floating-point operations to be performed with different precision levels by distinguishing instructions which are sensitive to precision from instructions which are not sensitive to precision when the instructions are processed in the pipeline 204, for example by the shader module 321 performing functions such as vertex shading 502, geometry shading 504, and fragment shading 506. PMS may allow different precision modes to be selected for precision-sensitive instructions and instructions which are not precision-sensitive, thereby allowing the precision-sensitive instructions or instruction blocks to be executed using a precision mode corresponding to a higher precision level (e.g., a precision level corresponding to a relatively high-precision floating-point number format such as the FP32 format), and allowing the instructions or instruction blocks which are not precision-sensitive to be executed using a precision mode corresponding to a lower precision level (e.g., a precision level corresponding to a relatively low-precision floating-point number format such as the BF16 format).

In embodiments, by allowing the pipeline 204 to switch between different precision modes corresponding to different floating-point number formats, PMS may allow dynamic clipping or truncating of the number of fraction bits F used to represent the mantissa of FP32 operands in instructions executed by a shader module 321 based on a particular precision mode which is used by the shader module 321. As a result, embodiments may provide a pipeline 204 which is capable of performing operations using different floating-point number formats which have different precision levels, for example a range of precision levels between the BF16 and FP32 formats.

In some embodiments, the precision mode may be selected based on a hint that is capable of being applied using programming languages at various levels, which may allow PMS to be utilized without modification of a user-level application.

In embodiments, the one or more shader modules 321 may be responsible for a significant portion of the power consumption of the GPU 203. By reducing the number of calculations performed by the one or more shader modules 321, embodiments may allow for a reduction in power consumption while adding only a small amount of overhead operations to switch precision modes according to PMS. Accordingly, embodiments may allow rendering quality to be maintained while reducing processing and memory requirements, thereby saving power through reduction of the overall amount of calculation.

In embodiments, this precision mode which is to be used by a particular shader module 321 to perform a particular operation may be determined or set based on a value stored in a mode register corresponding to the shader module 321. In embodiments, the mode register may be included in the shader module 321, however embodiments are not limited thereto. For example, in some embodiments the mode register may be included in the memory subsystem 205, or in another portion on the GPU 203 or the SOC 200. In embodiments, the mode register may indicate the number of LSB bits of an FP32 operand which are to be masked. In embodiments, the mode register value stored in the mode register may be read and written by the shader module 321 using scalar instructions.

In embodiments, when PMS is enabled, the mode register value may be set and updated per wave. For example, when an instruction or command to launch a new wave is received, the mode register corresponding to the wave may be initialized by setting the mode register value to a default value corresponding to a default precision mode. Then, based on receiving an instruction or command to change the precision mode for the wave to a new precision mode, the mode register value may be updated to indicate the new precision mode.

For example, in some embodiments the mode register value may be a 3-bit value. Accordingly, the default value may be "000", which may indicate a precision mode corresponding to the FP32 format. After the mode register is initialized to store the default value, an instruction or command may be received to change a precision mode according to the operations to be performed in the wave. Based on the changed precision mode, the mode register value may be updated to "001", which may indicate a precision mode corresponding to the BF28 format, "010", which may indicate a precision mode corresponding to the BF24 format, "100", which may indicate a precision mode corresponding to the BF20 format, or "010", which may indicate a precision mode corresponding to the BF16 format. However, embodiments are not limited thereto, and in embodiments any mode register value may be used to represent any precision mode corresponding to any number format. In embodiments, the updated mode register value may be visible to instructions which are subsequent to the instruction or command for setting the mode register value in a program order, and may not be visible to instructions which precede the instruction or command for setting the mode register value in the program order.

In some embodiments, the command or instruction to update the mode register value may be a dedicated register setting instruction which is used only to change the mode register value. For example, the dedicated register setting instruction may include an explicit scalar value which may be stored in the mode register. As another example, the dedicated register setting instruction may indicate a scalar register which stores the mode register value, and based on the mode register instruction being received, the mode register value may be retrieved from the scalar register and stored in the mode register. This may allow programmatic determination of the precision mode. For example, a desired precision mode may depend on a result of a calculation. After the calculation is performed, the result of the calculation may be stored in the scalar register, and then retrieved to be stored in the mode register in order to set the appropriate precision mode. In embodiments, the dedicated register setting instruction may be referred to as a mode instruction.

In some embodiments, the command or instruction to update the mode register value may be a modified instruction which is sometimes used to change the mode register value, and is otherwise used to perform different operations. For example, a dedicated register setting instruction may not be executed until all instructions sent to the shader module 321 are completed, and therefore may require a set of dependency counters to reach zero before it can be executed. This may increase a latency of the shader module 321 and may decrease a locality of a cache used to store operands for the shader module 321, which may cause both power and performance issues. However, because only vector instructions may be affected by the precision mode, and other instructions such as scalar instructions and branch instructions may not depend on the precision mode, it may not be necessary to wait until all instructions sent to the shader module are completed. Accordingly, a different instruction included in a given instruction set architecture (ISA), which is not subject to the wait-state penalty of the dedicated register setting instruction, may be conditionally modified in order to allow it to be used to set the mode register value. For example, an unused bit in the modified instruction may be designated as a control bit. Based on the control bit having a first value, the modified instruction may be interpreted as the register setting instruction, and based on the control bit having a second value, the modified instruction may be interpreted as the original instruction before modification. For example, the original instruction may include a denorming instruction or a rounding instruction, but embodiments are not limited thereto.

In some embodiments, the control bit may be checked based on a determination of whether PMS is enabled or disabled. For example, a configuration file or configuration bits for the GPU 203 may include a chicken bit corresponding to PMS. In embodiments, the chicken bit may be included in a configuration file corresponding to the GPU 203. Based on the chicken bit having a first value, PMS may be enabled, and the GPU 203 may check the control bit before executing the modified instruction. Based on the chicken bit having a second value, the control bit of the modified instruction may be ignored.

According to embodiments, the behavior of the shader module 321 may be modified in other ways based on the mode register value stored in the mode register. For example, when the mode register value is set to any value other than the default value, the floating-point rounding mode may be assumed to be a round-to-zero mode, and denormals may always be flushed to zero. In embodiments, operations such as fetching an exporting operands, for example reading and writing operands to and from an operand cache, may be performed at a normal level specified by the instruction, and may be not impacted or modified based on the precision mode.

In some embodiments, when the precision mode is any mode other than the default mode, operands may be clipped or truncated and rounded to zero according to the precision mode upon insertion into the pipeline 204. However, embodiments are not limited thereto, and in some embodiments the truncating maybe applied elsewhere. The truncating may be applied to all FP32 operands, regardless of the source of the operands (e.g. read from cache, destination buffer direct forwards, etc.). The truncating may be applied before input exception checking is performed in order to ensure functionally correct behavior. The truncated operands may be rounded to zero after input denormal exception checking, but before other exception checking, for example other IEEE exception checking.

In some embodiments, the truncating may be applied only to inputs of the shader module 321, and not to outputs of the shader module 321. For example, for an operation corresponding to the expression $a \times b = c$, the values of a and b may be inputs to the shader module 321, and the value of c may be an output of the shader module 321. Accordingly, the values of a and b may be truncated based on the precision mode, and the value of c which is output by the shader module 321 may not be truncated. The results of operations (e.g., the value of c) may be zero-padded in order to isolate changes within the pipeline 204.

In some embodiments, the mode register value may be propagated along with the instructions within the pipeline 204, so that instructions with different precision modes may exist in different stages of the pipeline 204 concurrently.

In some embodiments, one or more instructions may be excluded from PMS processing because changing the precision mode may impact the output of those instructions, or because changing the precision mode would not result in sufficient power savings. For example, certain instructions may be included in a whitelist, which may indicate that PMS is to be applied. Based on determining that an instruction is not included in the whitelist, the GPU 203 may execute the instruction without applying different precision modes according to PMS.

In some embodiments, implementing PMS may result in changes to exception behavior of the GPU 203, for example IEEE numerical exceptions. In embodiments, some IEEE numerical exceptions may be affected while other IEEE numerical exceptions may not be affected. For example, because denormals may be flushed to zero when the precision mode is any mode other than the default mode, it is not possible to receive more underflow exceptions. However, it is possible to receive new overflow exceptions from instructions for which the truncated operands produce larger results than the original non-truncated operands. Further, implementing PMS may result in more input denormal exceptions, and because more denormal results may be produced, implementing PMS may result in a higher input denormal count. Additional divide-by-zero exceptions should not occur due to truncating operands, so implementing PMS may not cause changes to divide-by-zero exceptions. However, truncating operands according to PMS may result in additional inexact exceptions, and inexact exceptions that may be raised earlier in an instruction when executed based on the non-truncated operand may not occur when the instruction is executed based on the truncated operand. For example, an instruction may produce an output of (m/(n+e)), which is exact, based on non-truncated operands m and (n+e). However, when the operands are truncated according to a particular precision mode, the truncated operands may be m and n. Therefore, the instruction may produce an output of (m/n) based on the truncated operands, which may be inexact. Implementing PMS may produce no changes to invalid exceptions. In addition, because integer operations may not be affected, implementing PMS may cause no changes to integer divide-by-zero exceptions.

Figure 6A:
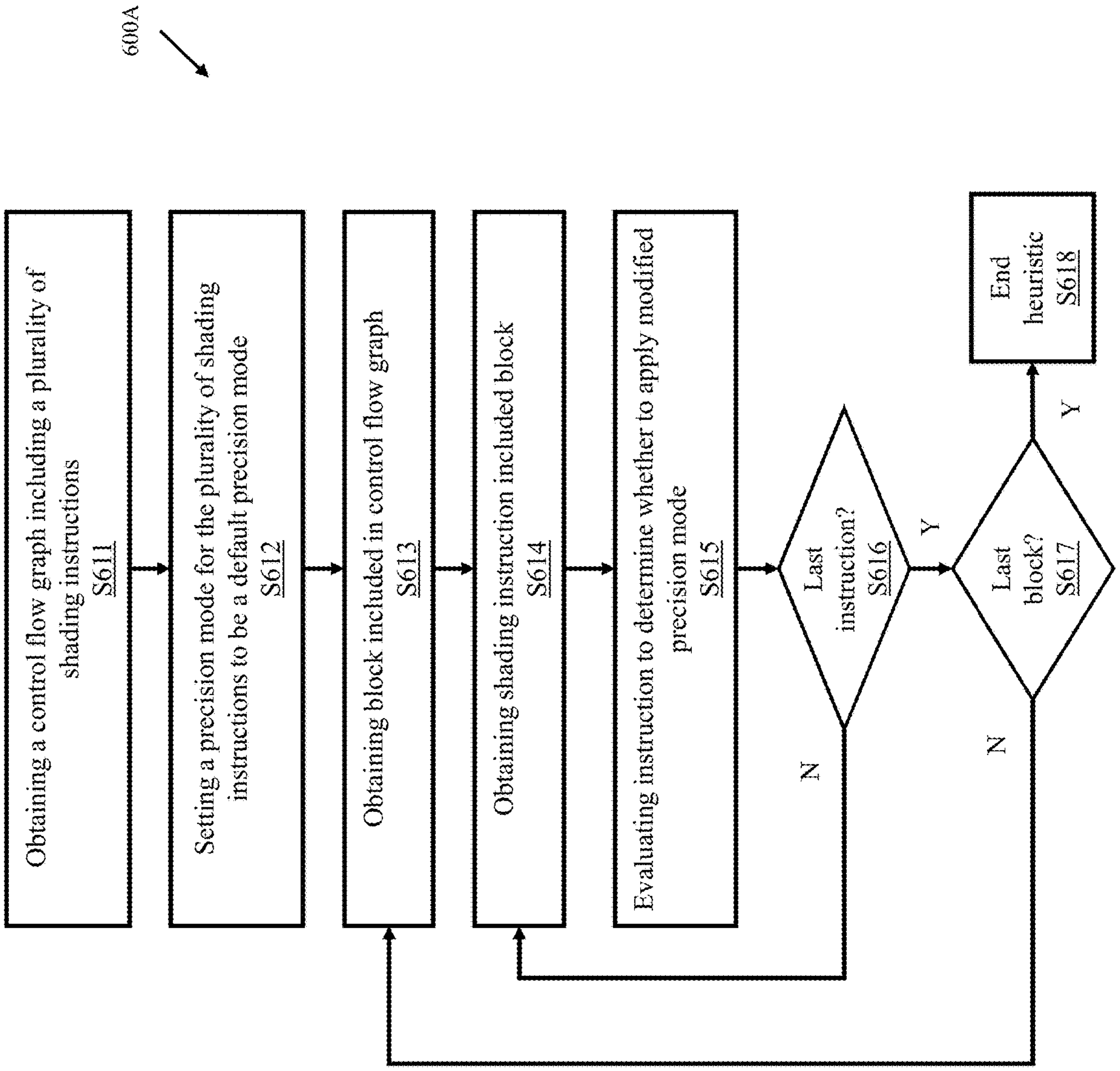
FIGS. 6A-6C are flowcharts illustrating example heuristics for performing precision modulated shading (PMS), according to embodiments.
Figure 6B:
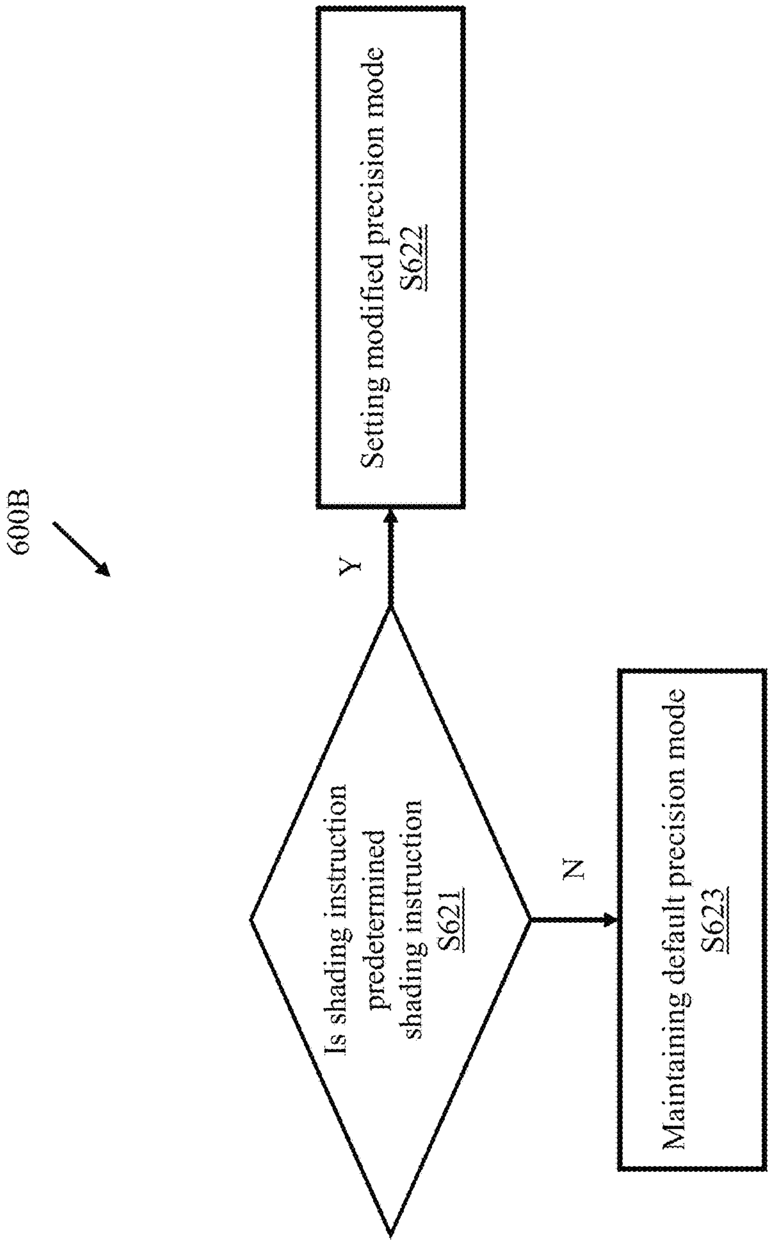
Figure 6C:
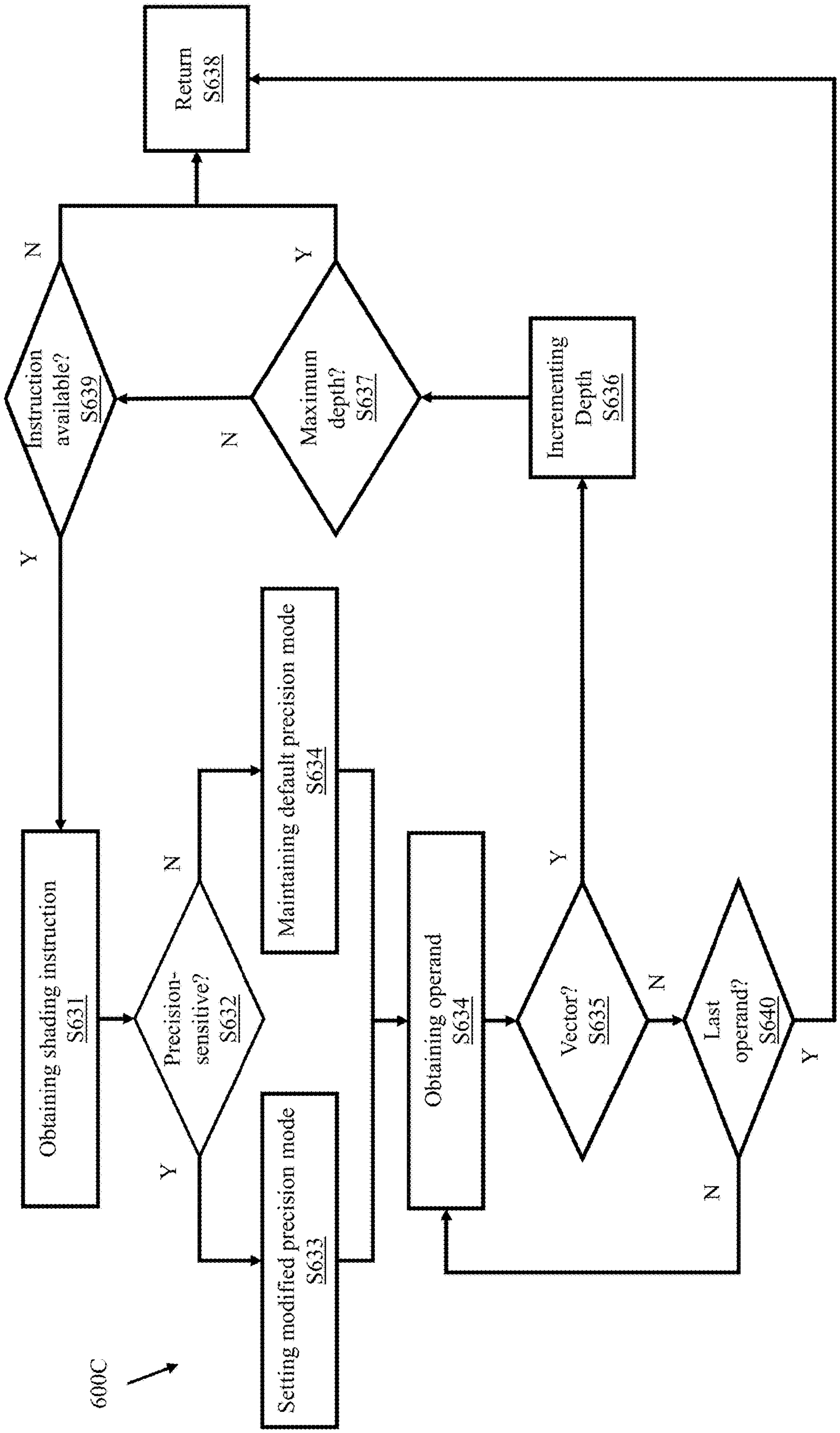

According to embodiments, when the PMS is enabled, the GPU 203 may perform PMS by applying different precision modes to various instructions. The GPU 203 may determine whether to apply different precision modes an instruction based on a heuristic. FIGS. 6A-6C are flowcharts illustrating example heuristics, according to embodiments.

FIG. 6A is a flowchart of a process 600A for performing PMS. In embodiments, the process 600A may correspond to heuristic for determining whether to apply different precision modes while performing PMS. In embodiments, the process 600A may be performed by any of the elements described above, for example at least one of the GPU 203 and the elements included therein, or any element executing a pipeline 500, as discussed above.

As shown in FIG. 6A, at operation S611 the process 600A may include obtaining a control flow graph including a plurality of shading instructions. In embodiments, the shading instructions may be instructions which are to be executed by a shading processor, for example the shader module 321 discussed above, or any element performing the vertex shading 502, the geometry shading 504, and the fragment shading 506 discussed above.

As further shown in FIG. 6A, at operation S612 the process 600A may include setting a precision mode for the plurality of shading instructions to a default precision mode. In embodiments, the default precision mode may correspond to a relatively low precision level, for example a precision level corresponding to the BF16 format.

As further shown in FIG. 6A, at operation S613 the process 600A may include obtaining a block included in the control flow graph, and at operation S614 the process 600A may include obtaining a shading instruction included in the block. In embodiments, a block may refer to a set of instructions which receive a single input and produce a single output, for example a set of instructions that can be executed without any intermediate exit points.

As further shown in FIG. 6A, at operation S615 the process 600A may include evaluating the instruction to determine whether to apply a modified precision mode when the instruction is executed. For example, based on the default precision mode corresponding to a relatively low precision level, operation S615 may include evaluating the instruction to determine whether to apply a modified precision mode corresponding to a higher precision level, for example a precision mode corresponding to any of the BF16 format, the BF20 format, the BF24 format, the BF28 format, and the FP32 format. As another example, based on the default precision mode corresponding to a relatively high precision level, operation S615 may include evaluating the instruction to determine whether to apply a modified precision mode corresponding to a lower precision level, for example a precision mode corresponding to any of the BF16 format, the BF20 format, the BF24 format, the BF28 format, and the FP32 format. Examples of the evaluating are provided below with respect to processes 600B and 600C.

As further shown in FIG. 6A, at operation S616 the process 600A may include determining whether the last instruction of the block has been reached. Based on determining that additional instructions remain in the block (N at operation S616), the process 600A may return to operation S614. Based on determining that no additional instructions remain in the block (Y at operation S616), the process 600A may proceed to operation S617.

As further shown in FIG. 6A, at operation S617 the process 600A may include determining whether the last block of the control flow graph has been reached. Based on determining that additional blocks remain in the control flow graph (N at operation S617), the process 600A may return to operation S613. Based on determining that no additional instructions remain in the block (Y at operation S617), the process 600A may proceed to operation S618, at which the heuristic is terminated.

FIG. 6B is a flowchart of a process 600B for performing PMS. In embodiments, the process 600B may correspond to operation S615 discussed above. In embodiments, the process 600B may be performed by any of the elements described above, for example at least one of the GPU 203 and the elements included therein, or any element executing a pipeline 500, as discussed above.

As shown in FIG. 6B, at operation S621 the process 600B may include determining whether a shading instruction is a predetermined instruction. Based on determining that the shading instruction is the predetermined shading instruction (Y at operation S621), the process 600B may proceed to operation S622, and change the precision mode to a modified precision mode for the shading instruction. For example, operation S622 may include setting a high precision mode for the shading instruction, but embodiments are not limited thereto. For example, in some embodiments, operation S622 may include setting the precision mode to a low precision mode corresponding to a low precision level that is lower than the default precision level. Based on determining that the shading instruction is not the predetermined shading instruction (N at operation S621), the process 600B may proceed to operation S623, and maintain the default precision mode for the shading instruction.

For example, the predetermined shading instruction may be a shading instruction which is known to be precision-sensitive. This may mean that there is a high likelihood that the shading instruction will produce incorrect or corrupted results if operands of the shading instruction are truncated based on the default precision mode. Therefore, based on determining that the shading instruction is a precision-sensitive instruction, the modified precision mode (e.g., the high precision mode) is set for the instruction.

FIG. 6C is a flowchart of a process 600C for performing PMS. In embodiments, the process 600C may correspond to operation S615 discussed above. In embodiments, the process 600C may be performed by any of the elements described above, for example at least one of the GPU 203 and the elements included therein, or any element executing a pipeline 500, as discussed above.

As shown in FIG. 6C, at operation S631 the process 600C may include obtaining a shading instruction.

As further shown in FIG. 6C, at operation S632 the process 600C may include determining whether the shading instruction is precision-sensitive. Based on determining that the shading instruction is the predetermined shading instruction (Y at operation S632), the process 600C may proceed to operation S633, and change the precision mode to a modified precision mode for the shading instruction. For example, operation S633 may include setting a high precision mode for the shading instruction, but embodiments are not limited thereto. For example, in some embodiments, operation S633 may include setting the precision mode to a low precision mode corresponding to a low precision level that is lower than the default precision level. Based on determining that the shading instruction is not the predetermined shading instruction (N at operation S632), the process 600B may proceed to operation S634, and maintain the default precision mode for the shading instruction.

As further shown in FIG. 6C, at operation S634 the process 600C may include obtaining an operand for the shading instruction.

As further shown in FIG. 6C, at operation S635 the process 600C may include determining whether the operand is a vector operand. Based on determining that the operand is a vector operand (Y at operation S635), the process 600C may increment a depth counter at operation S636. In embodiments, the depth counter may indicate a depth in an upward direction in use-definition chain of instructions. As discussed above, in some embodiments, PMS may only be applied to vector instructions which operate on vector operands. Therefore, the process 600C may be used to determine whether a previous shading instruction in the use-definition chain (e.g., a shading instruction which produces the operand) is subject to PMS as well, in order to determine whether a modified precision mode (e.g., a high precision mode) should be applied to the previous shading instruction.

As further shown in FIG. 6C, at operation S636, the process 600C may include determining whether a maximum recursion depth has been reached, for example by comparing the depth counter to a threshold recursion depth. Based on determining that the maximum recursion depth has been reached (Y at operation S637), the process 600C may proceed to operation S638, at which the process 600C is terminated (e.g., by proceeding to operation S616 in the process S600A). Based on determining that the maximum recursion depth has not been reached (N at operation S637), the process 600C may proceed to operation S639, and determining whether a shading instruction is available at the present depth. Based on determining that a shading instruction is available at the present depth (Y at operation S639), the process 600C may return to operation S631. Based on determining that a shading instruction is not available at the present depth, the process 600C may proceed to operation S638.

As further shown in operation S640, based on determining that the operand is not a vector operand (N at operation S635), the process 600C may proceed to operation S640, and determine whether the last operand has been reached. Based on determining that the last operand has been reached (Y at operation S640), the process 600C may proceed to operation S638. Based on determining that the last operand has not been reached, the process 600C may return to operation S634. In some embodiments, if the last operand at a present depth has been reached, the process 600C may include decrementing the depth counter before returning to operation S634, so that all operands at each depth may be evaluated.

Therefore, the process 600C may be used to evaluate additional instructions in an upward direction along a use-definition chain of shading instructions, in order to ensure that an appropriate precision level is maintained in operands as they are provided or produced in a downward direction along the use-definition chain.

According to embodiments, the heuristic described above with respect to FIGS. 6A-6C may be controlled according to various parameters, which may be referred to as heuristic knobs. These parameters may be modified in order to change how PMS is applied. In embodiments, the parameters or heuristic knobs may include a default precision mode, a modified precision mode applied to predetermined shading instructions (e.g., the modified precision mode applied in the process 600B), a modified precision mode applied to shading instructions in a use-definition chain (e.g., the modified precision mode applied in the process 600C), a list of precision-sensitive instructions, and a maximum recursion depth. By modifying one or more of these heuristic knobs, the behavior of PMS operations may be modified as desired.

Figure 7:
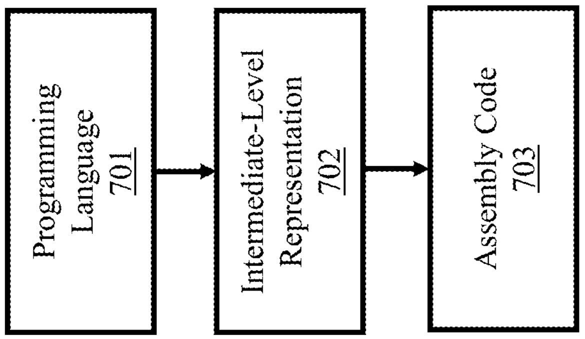
FIG. 7 is a diagram illustrating programming languages for performing image processing tasks, according to embodiments.

FIG. 7 is a diagram illustrating programming languages for performing processing tasks such as image and graphics processing tasks, according to embodiments. In particular, FIG. 7 shows a high-level programming language 701, an intermediate-level representation 702, and assembly code 703, which may be used to directly control one or more elements discussed above, for example the GPU 203, the pipeline 204, and the shader module 321. In embodiments, the high-level programming language 701 may be a programming language used by a user to control operations of the GPU 703. The intermediate-level representation 702 may be generated based on code written in the high-level programming language 701, and the assembly code 703 may be generated based on the intermediate-level representation 702. In embodiments, the assembly code 703 may include or correspond to the instructions discussed above, for example the register setting instruction, the modified instruction, and the shader instructions. As discussed above, when PMS is enabled, the precision mode for a particular instruction may be specified by a hint which may be inserted at any level shown in FIG. 7. For example, a user may insert a hint into a program written in the programming language 701, or may insert the hint into an intermediate-level representation 702 or assembly code 703 which is generated based on the program. Accordingly, a user may be able to set a precision mode without needing to directly access instructions in the assembly code 703.

Figure 8:
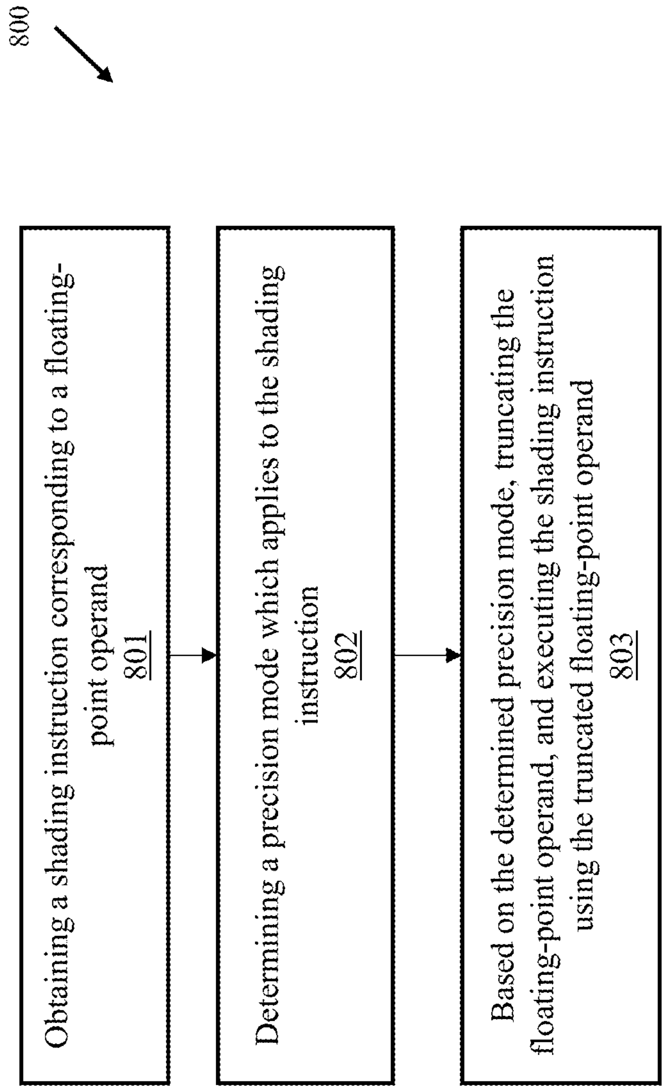
FIG. 8 is a flowchart illustrating an example process for performing PMS, according to embodiments.

FIG. 8 is a flowchart illustrating an example process for performing PMS, according to embodiments. In embodiments, the process 800 may be performed by any of the elements described above, for example at least one of the GPU 203 and the elements included therein, or any element executing a pipeline 500, as discussed above.

As shown in FIG. 8, at operation S801 the process 800 may include obtaining a shading instruction corresponding to a floating-point operand. In embodiments, the shading instruction may be an instructions which is to be executed by a shading processor, for example the shader module 321 discussed above, or any element performing the vertex shading 502, the geometry shading 504, and the fragment shading 506 discussed above.

As further shown in FIG. 8, at operation S802 the process 800 may include determining a precision mode which applies to the shading instruction. In embodiments, the precision mode may be determined based on a value stored in a mode register.

As further shown in FIG. 8, at operation S803 the process 800 may include, based on the determined precision mode, truncating the floating-point operand, and executing the shading instruction using the truncated floating-point operand.

The truncating of the floating-point operand may include truncating a mantissa of the floating-point operand while maintaining an exponent of the floating-point operand. In embodiments, a precision of the truncated floating-point operand may be lower than a precision of the floating-point operand, and a dynamic range of the truncated floating-point operand may be same as a dynamic range of the floating-point operand.

In embodiments, the process 800 may further include determining whether the shading instruction is included in a whitelist, wherein based on determining that the shading instruction is not included in the whitelist, the shading instruction may be processed using the floating-point operand without determining the precision mode.

In embodiments, the determining the precision mode may include determining whether the PMS is enabled based on a value of a configuration bit included in a configuration file corresponding to the GPU, wherein based on the PMS being enabled, the plurality of precision modes may be used to process the shading instructions, and wherein based on the PMS being not enabled, the plurality of precision modes may be not used to process the shading instructions.

In embodiments, the process 800 may further include receiving a mode instruction for setting a new mode; and changing the value stored in the mode register to a new value corresponding to the new mode, wherein the new value may be visible to instructions subsequent to the mode instruction in a program order, and may be not visible to instructions prior to the mode instruction in the program order. In embodiments, the mode instruction may correspond to at least one of the register setting instruction and the modified instruction discussed above.

In embodiments, the mode instruction may include a control bit and instruction bits, wherein based on the PMS being enabled and the control bit being set, the instruction bits may be interpreted as the mode instruction, wherein based on the PMS being enabled and the control bit being not set the instruction bits may be interpreted as a different instruction, and wherein based on the PMS being not enabled, the control bit may be ignored, and the instruction bits may be interpreted as the different instruction. In embodiments, the mode instruction may correspond to the modified instruction discussed above, and the different instruction may correspond to the original instruction discussed above.

Although FIGS. 6A-6C and 8 show example blocks of the processes 600A, 600B, 600C, and 800, in some implementations, one or more of the processes 600A, 600B, 700C, and 800 may include additional blocks, fewer blocks, different blocks, or differently arranged blocks than those depicted in FIGS. 6A-6C and 800. Additionally, or alternatively, two or more of the blocks of the processes 600A, 600B, 600C, and 800 may be arranged or combined in any order, or performed in parallel.

While various example embodiments have been particularly shown and described with reference to the drawings, it will be understood that various changes in form and details may be made therein without departing from the spirit and scope of the following claims.

What is claimed is:

1. A method of performing precision-modulated shading (PMS) using a graphics processing unit (GPU), the method comprising:

obtaining a shading instruction corresponding to a floating-point operand;

determining a precision mode which applies to the shading instruction from among a plurality of precision modes for processing shading instructions; and based on the determined precision mode, truncating the floating-point operand, and executing the shading instruction using the truncated floating-point operand, wherein the determining the precision mode comprises determining whether the PMS is enabled based on a value of a configuration bit included in a configuration file corresponding to the GPU, wherein based on the PMS being enabled, the plurality of precision modes are used to process the shading instructions, and wherein based on the PMS being not enabled, the plurality of precision modes are not used to process the shading instructions.

2. The method of claim 1, wherein the shading instruction is executed by a shader processor included in the GPU.

3. The method of claim 1, wherein the truncating of the floating-point operand comprises truncating a mantissa of the floating-point operand while maintaining an exponent of the floating-point operand, wherein a precision of the truncated floating-point operand is lower than a precision of the floating-point operand, and wherein a dynamic range of the truncated floating-point operand is the same as a dynamic range of the floating-point operand.

4. The method of claim 1, further comprising determining whether the shading instruction is included in a whitelist, wherein based on determining that the shading instruction is not included in the whitelist, the shading instruction is processed using a default precision mode.

5. The method of claim 1, wherein the precision mode is determined based on a value stored in a mode register corresponding to the shading instruction.

6. The method of claim 5, further comprising:

receiving a mode instruction for setting a new mode; and changing the value stored in the mode register to a new value corresponding to the new mode, wherein the new value is visible to instructions subsequent to the mode instruction in a program order, and is not visible to instructions prior to the mode instruction in the program order.

7. The method of claim 6, wherein the mode instruction comprises a control bit and instruction bits, wherein based on the PMS being enabled and the control bit being set, the instruction bits are interpreted as the mode instruction, wherein based on the PMS being enabled and the control bit being not set the instruction bits are interpreted as a different instruction, and wherein based on the PMS being not enabled, the control bit is ignored, and the instruction bits are interpreted as the different instruction.

8. The method of claim 1, further comprising:

obtaining a control flow graph comprising a plurality of shading instructions;

setting the precision mode for the plurality of shading instructions to be a default precision mode, wherein the default precision mode corresponds to a first precision level; and evaluating each instruction in the plurality of shading instructions to determine whether to apply a modified precision mode, wherein the modified precision mode corresponds to a second precision level that is different from the first precision level.

9. The method of claim 8, wherein the evaluating comprises determining whether a first shading instruction from among the plurality of shading instructions is a predetermined shading instruction, and wherein based on determining that the first shading instruction is the predetermined shading instruction, the method further comprises setting the precision mode for the first shading instruction to the modified precision mode.

10. The method of claim 9, wherein the evaluating further comprises determining whether the first shading instruction is precision-sensitive, and wherein based on determining that the first shading instruction is precision-sensitive, the method further comprises:

determining a second instruction which provides the first shading instruction, and setting the precision mode for the second instruction to the modified precision mode.

11. A method of performing precision-modulated shading (PMS) using a graphics processing unit (GPU), the method comprising:

obtaining a control flow graph comprising a plurality of shading instructions;

setting a precision mode for the plurality of shading instructions to be a default precision mode, wherein the default precision mode corresponds to a first precision level; and evaluating each instruction in the plurality of shading instructions to determine whether to apply a modified precision mode, wherein the modified precision mode corresponds to a second precision level that is different from the first precision level; and based on the default precision mode being applied to a first shading instruction from among the plurality of shading instructions, controlling at least one shader processor to:

set a mode register included in the at least one shader processor to a first value corresponding to the default precision mode, truncate a first floating-point operand corresponding to the first shading instruction, and execute the first shading instruction using a computation module included in the at least one shader processor based on the truncated first floating-point operand.

12. The method of claim 11, wherein the evaluating comprises determining whether the first shading instruction is a predetermined shading instruction, and wherein based on determining that the first shading instruction is the predetermined shading instruction, the method further comprises setting the precision mode for the first shading instruction to the modified precision mode.

13. The method of claim 12, wherein the evaluating further comprises determining whether the first shading instruction is precision-sensitive, and wherein based on determining that the first shading instruction is precision-sensitive, the method further comprises:

determining a second shading instruction which provides the first shading instruction, and setting the precision mode for the second shading instruction to the modified precision mode.

14. The method of claim 13, wherein the first shading instruction and the second shading instruction are included in a use-definition chain, wherein the evaluating comprises evaluating a plurality of additional instructions in the use-definition chain, and wherein a number of the plurality of additional instructions is determined based on a predetermined maximum recursion depth.

15. The method of claim 11, wherein the plurality of shading instructions comprises a second shading instruction corresponding to a second floating-point operand, and wherein based on the default precision mode being applied to the second shading instruction, the method further comprises controlling the at least one shader processor to execute the second shading instruction using the second floating-point operand.

16. The method of claim 15, wherein the truncating of the first floating-point operand comprises truncating a mantissa of the first floating-point operand while maintaining an exponent of the first floating-point operand, wherein a precision of the truncated first floating-point operand is lower than a precision of the first floating-point operand, and wherein a dynamic range of the truncated first floating-point operand is the same as a dynamic range of the first floating-point operand.

17. A graphics processing unit (GPU) for performing precision-modulated shading (PMS), the GPU comprising:

at least one shader processor configured to:

obtain a shading instruction corresponding to a floating-point operand;

determine a precision mode which applies to the shading instruction from among a plurality of precision modes for processing shading instructions; and based on the determined precision mode, truncate the floating-point operand, and execute the shading instruction using the truncated floating-point operand, wherein in order to determine the precision mode, the at least one shader processor is further configured to determine whether the PMS is enabled based on a value of a configuration bit included in a configuration file corresponding to the GPU, wherein based on the PMS being enabled, the plurality of precision modes are used to process the shading instructions, and wherein based on the PMS being not enabled, the plurality of precision modes are not used to process the shading instructions.

18. The GPU of claim 17, wherein to truncate the floating-point operand the at least one shader processor is further configured to truncate a mantissa of the floating-point operand while maintaining an exponent of the floating-point operand, wherein a precision of the truncated floating-point operand is lower than a precision of the floating-point operand, and wherein a dynamic range of the truncated floating-point operand is the same as a dynamic range of the floating-point operand.

19. The GPU of claim 17, wherein the at least one shader processor is further configured to determine whether the shading instruction is included in a whitelist, and wherein based on determining that the shading instruction is not included in the whitelist, the shading instruction is processed using the floating-point operand in a default precision mode.

20. The GPU of claim 17, wherein the precision mode is determined based on a value stored in a mode register corresponding to the shading instruction.

21. The GPU of claim 20, wherein the at least one shader processor is further configured to:

receive a mode instruction for setting a new mode; and change the value stored in the mode register to a new value corresponding to the new mode, wherein the new value is visible to instructions subsequent to the mode instruction in a program order, and is not visible to instructions prior to the mode instruction in the program order.

22. The GPU of claim 21, wherein the mode instruction comprises a control bit and instruction bits, wherein based on the PMS being enabled and the control bit being set, the instruction bits are interpreted as the mode instruction, wherein based on the PMS being enabled and the control bit being not set the instruction bits are interpreted as a different instruction, and wherein based on the PMS being not enabled, the control bit is ignored, and the instruction bits are interpreted as the different instruction.

23. The GPU of claim 17, wherein the at least one shader processor is further configured to:

obtain a control flow graph comprising a plurality of shading instructions;

set the precision mode for the plurality of shading instructions to be a default precision mode, wherein the default precision mode corresponds to a first precision level; and evaluate each instruction in the plurality of shading instructions to determine whether to apply a modified precision mode, wherein the modified precision mode corresponds to a second precision level that is different from the first precision level.

24. The GPU of claim 23, wherein to evaluate each instruction, the at least one shader processor is further configured to determine whether a first shading instruction from among the plurality of shading instructions is a predetermined shading instruction, and wherein based on determining that the first shading instruction is the predetermined shading instruction, the at least one shader processor is further configured to set the precision mode for the first shading instruction to the modified precision mode.

25. The GPU of claim 24, wherein to evaluate each instruction, the at least one shader processor is further configured to determine whether an input to the first shading instruction is precision-sensitive, and wherein based on determining that the input to the first shading instruction is precision-sensitive, the at least one shader processor is further configured to:

determine a second instruction which provides the input to the first shading instruction, and set the precision mode for the second instruction to the modified precision mode.

26. A device for performing precision-modulated shading (PMS), the device comprising:

a graphics processing unit (GPU) comprising at least one shader processor, wherein the at least one shader processor comprises a mode register and a computation module; and at least one controller configured to:

obtain a control flow graph comprising a plurality of shading instructions, set a precision mode for the plurality of shading instructions to be a default precision mode, wherein the default precision mode corresponds to a first precision level, and evaluate each instruction in the plurality of shading instructions to determine whether to apply a modified precision mode, wherein the modified precision mode corresponds to a second precision level that is different from the first precision level, wherein based on the default precision mode being applied to a first shading instruction from among the plurality of shading instructions, the at least one controller is further configured to control the at least one shader processor to:

set the mode register to a first value corresponding to the default precision mode, truncate a first floating-point operand corresponding to the first shading instruction, and execute the first shading instruction using the computation module based on the truncated first floating-point operand.

27. The device of claim 26, wherein to evaluate each instruction, the at least one controller is further configured to determine whether the first shading instruction is a predetermined shading instruction, and wherein based on determining that the first shading instruction is the predetermined shading instruction, the at least one controller is further configured to set the precision mode for the first shading instruction to the modified precision mode.

28. The device of claim 27, wherein to evaluate each instruction, the at least one controller is further configured to determine whether an input to the first shading instruction is precision-sensitive, and wherein based on determining that the input to the first shading instruction is precision-sensitive, the at least one controller is further configured to:

determine a second shading instruction which provides the input to the first shading instruction, and set the precision mode for the second shading instruction to the modified precision mode.

29. The device of claim 28, wherein the first shading instruction and the second shading instruction are included in a use-definition chain, wherein to evaluate each instruction, the at least one controller is further configured to evaluate a plurality of additional instructions in the use-definition chain, and wherein a number of the plurality of additional instructions is determined based on a predetermined maximum recursion depth.

30. The device of claim 26, wherein the plurality of shading instructions comprises a second shading instruction corresponding to a second floating-point operand, and wherein based on the default precision mode being applied to the second shading instruction, the at least one controller is further configured to control the at least one shader processor to execute the second shading instruction using the second floating-point operand.

31. The device of claim 30, wherein to truncate the first floating-point operand, the at least one controller is further configured to truncate a mantissa of the first floating-point operand while maintaining an exponent of the first floating-point operand, wherein a precision of the truncated first floating-point operand is lower than a precision of the first floating-point operand, and wherein a dynamic range of the truncated first floating-point operand is the same as a dynamic range of the first floating-point operand.

* * * * *